455-608 AU 233 EX
EIP8106 OR 3,638,024
[redacted]

United States Patent

Chen et al.

[15] 3,638,024
[45] Jan. 25, 1972

[54] OPTICAL PULSE INTERVAL MODULATION SYSTEM

[72] Inventors: Fang-Shang Chen, New Providence; Tracy Stewart Kinsel, Bridgewater Township, Somerset County, both of N.J.

[73] Assignee: Bell Telephone Laboratories, Incorporated, Murray Hill, N.J.

[22] Filed: Feb. 25, 1970

[21] Appl. No.: 14,010

[52] U.S. Cl. ..............................250/199, 350/147, 350/150
[51] Int. Cl. ..............................H04b 9/00
[58] Field of Search ..............................250/199; 250/147, 150

[56] References Cited

UNITED STATES PATENTS

| | | | |
|---|---|---|---|
| 3,462,211 | 8/1969 | Nelson | 350/150 |
| 3,532,890 | 10/1970 | Denton | 250/199 |

*Primary Examiner*—Robert L. Griffin
*Assistant Examiner*—Kenneth W. Weinstein
*Attorney*—R. J. Guenther and Kenneth B. Hamlin

[57] ABSTRACT

Electrical information signals are utilized to modulate the regularly spaced-apart optical pulses provided by an input source such as a mode-locked laser. The modulation process involves selectively delaying each input optical pulse such that it occurs in a specified one of the plural time slots defined between adjacent ones of the unmodulated pulses. (This process has been designated pulse interval modulation.) Modulation is accomplished by utilizing at least one polarization-sensitive prism and a modulator element responsive to the electrical information signals for changing the polarization condition of optical pulses propagated through the element. An optical pulse whose polarization condition is altered by the modulator element is made to repeatedly traverse a storage path. After a predetermined number of such traversals, the polarization condition of the pulse is altered by the modulator element whereby the pulse is then directed to an output path in a specified one of the plural time slots.

7 Claims, 4 Drawing Figures

INVENTORS F. S. CHEN
T. S. KINSEL
BY Lucian C. Canepa
ATTORNEY

OPTICAL PULSE INTERVAL MODULATION SYSTEM

BACKGROUND OF THE INVENTION

1. Field of the Invention

This invention relates to signal translation and more particularly to a system in which electrical information signals are utilized to selectively modify the output of an optical pulse source.

2. Description of the Prior Art

The output of a laser mode-locked by an intracavity loss modulator of the type disclosed in L. E. Hargrove U.S. Pat. No. 3,412,251, issued Nov. 19, 1968, comprises a sequence of very narrow regularly spaced-apart optical pulses. Alternatively the output of a laser mode-locked by an intracavity phase modulator will consist of a similar sequence of narrow pulses. These pulses are usually much shorter than the time interval between them. To utilize such a sequence in an optical pulse communication system it is necessary that the regular nature of the sequence be altered in some systematic manner so as to embody therein intelligence to be transmitted. Various schemes for modifying such a sequence in accordance with information signals have been investigated in recent years. Of these the technique known as pulse interval modulation (PIM) has been shown to constitute a particularly advantageous format for achieving an efficient optical communication system.

In a PIM system, each regular interpulse interval of an unmodulated sequence is regarded as being divided into a plurality of discrete time slots. One and only one pulse is permitted to occur in each interpulse interval. Each time slot in which a pulse may occur is in effect representative of a unique code symbol. In response to an electrical information signal, an unmodulated pulse is controlled to occur in a specified single one of the plural time slots in an interpulse interval. In this way, the location of the pulse in the multislot interval is made to be representative of the information signal associated therewith.

SUMMARY OF THE INVENTION

An object of the present invention is an improved signal translation system.

A more particular object of this invention is an improved optical-pulse-processing system.

Another object of the present invention is an information-processing system in which electrical signals are utilized to impose a PIM format on an optical pulse sequence.

Briefly, these and other objects of the present invention are realized in a specific illustrative embodiment thereof that comprises a source of optical pulses characterized by a reference polarization condition. These pulses are propagated along a main path that includes two polarization-sensitive prisms and a modulator positioned therebetween, the state of the modulator being controlled by an associated electrical information signal source. If the modulator is not activated by the signal source, an input pulse passes through both the prisms and the modulator and is delivered to an output circuit in the first time slot of an interpulse interval. On the other hand, if the modulator is activated by the signal source at the time an input pulse propagates therethrough, the polarization condition of the pulse is selectively altered. In that case, the pulse is deflected by the output prism around a closed-loop path which leads back to the input prism. In turn, the input prism directs the pulse through the modulator again. If the modulator is then unactivated, the pulse will continue to be routed around the closed-loop or storage path. Finally, when the modulator is reactivated, the polarization condition of the pulse is thereby changed back to its initial condition whereby the output prism directs the pulse to the output circuit. Thus, by controlling the time interval between a pair of information signals applied to the modulator, the number of times that an input pulse traverses the closed loop may be exactly controlled. In turn, such control determines the time slot in which the pulse is delivered to the output circuit. Because of the short time duration of the optical pulses, the information signals applied to the modulator have the full duration of a time slot in which to effect a change in the modulator element. This reduces the bandwidth requirements of the information source.

In an alternative embodiment of the principles of the present invention, a single polarization-sensitive prism is combined with a modulator to control the number of times that an input optical pulse is made to traverse a storage path before being released therefrom to an output circuit.

It is accordingly a feature of the present invention that a polarization-sensitive element be combined with a modulator which is adapted to selectively control the polarization condition of an optical pulse propagated therethrough whereby such a pulse can be routed to traverse a storage path a prescribed number of times before being directed to an output path.

BRIEF DESCRIPTION OF THE DRAWING

A complete understanding of the present invention and of the above and other objects, features and advantages thereof may be gained from a consideration of the following detailed description of several specific illustrative embodiments thereof presented hereinbelow in connection with the accompanying drawing, in which.

DETAILED DESCRIPTION

Figure 1:
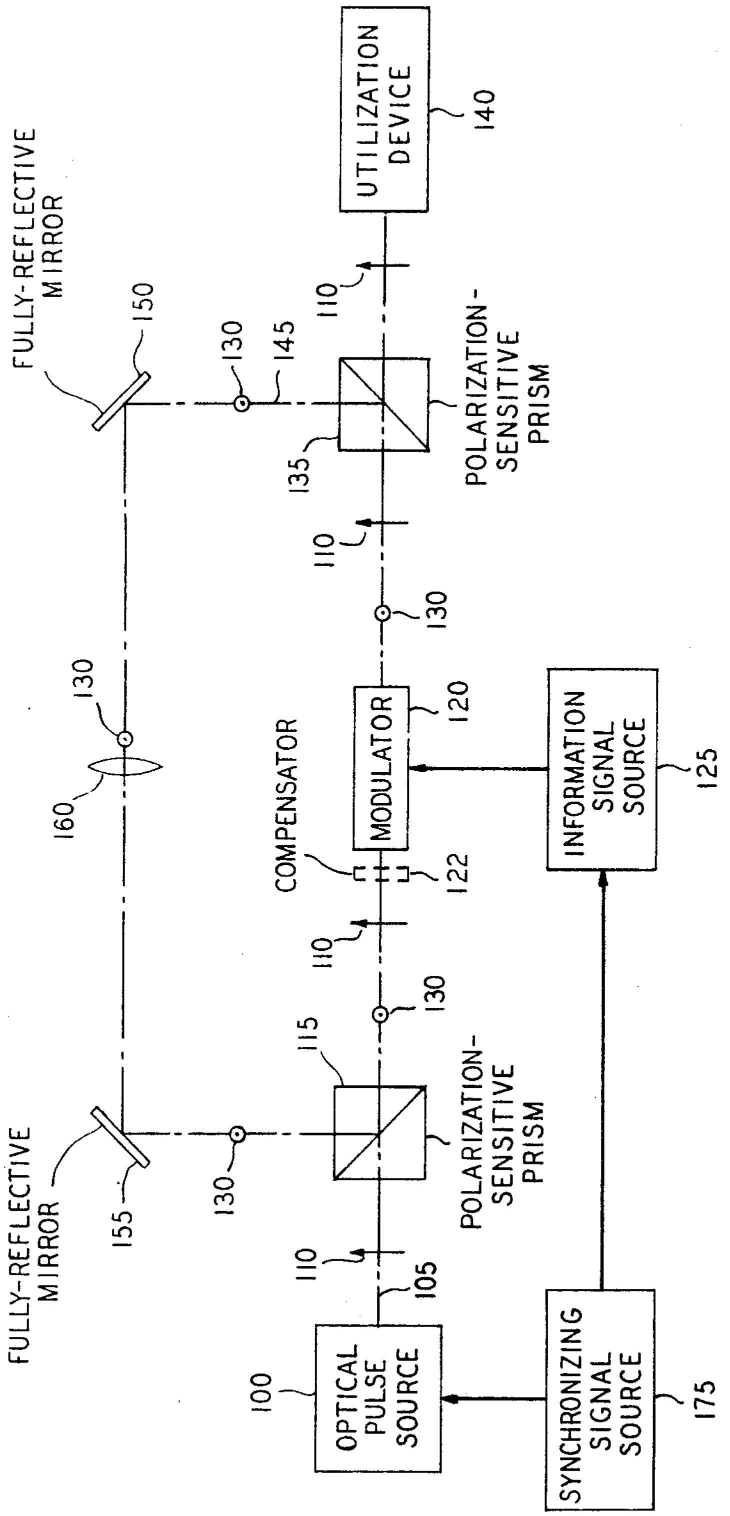
FIG. 1 depicts a specific illustrative optical processing system made in accordance with he principles of the present invention.

The system shown in FIG. 1 comprises a source 100 which is adapted to generate optical pulses. Pulses emitted from the source 100 are directed along a main or horizontal path 105 that is designated by a dot-dash line. The pulses provided by the source 100 are plane-polarized in a reference orientation that is represented by short vertical arrows 110.

Illustratively, the source 100 comprises a mode-locked laser of the type disclosed in the aforecited Hargrove patent or, advantageously, the laser may be of the type described in a copending application of T. S. Kinsel, now U.S. Pat. No. 3,586,997, issued June 22, 1971. In any case, the output of the source 100 constitutes a sequence of very narrow pulses, which are represented in the top row of FIGS. 2 and 3. By way of illustration, the pulses are shown in the drawing as being regularly spaced-apart.

The aforementioned reference polarization condition may be established by the source 100 itself. Alternatively, a separate polarizing element (not shown) may be disposed to the right of the source 100 in the path of pulses emitted therefrom to impose the required initial polarization condition.

A polarization-sensitive element 115 (for example, a Rochon, Wollaston or Glan-Thompson prism) is positioned in the way of pulses propagated along the main path 105. The element 115 is arranged such that plane-polarized input pulses from the source 100 are passed through the element 115 without being deflected. In turn, such pulses pass through a transparent modulator 120 which whether activated or not (by an associated information signal source 125) does not deflect the pulses from the main path. However, as described in detail later below, whether or not the modulator is activated does determine whether the polarization condition of pulses emerging therefrom is changed. Pulses emerging from the modulator 120 will either still be plane-polarized in the reference state (as indicated by the arrows 110) or will have effectively had their polarization vectors rotated by 90°. This latter condition is represented in the drawing by encircled dots 130.

A variety of optical modulator units of the electro-optical or magneto-optical type, and each suitable for inclusion in the FIG. 1 arrangement, are known in the art.

After traversing the modulator 120 shown in FIG. 1, pulses propagate to a second polarization-sensitive element 135. Pulses that are still polarized in the reference condition (arrow 110) pass through the element 135 without being deflected and travel directly to an output utilization device 140. On the other hand, a pulse whose polarization vector has been rotated by 90° (represented by the encircled dots 130) is deflected upward by the polarization-sensitive element 135 to follow a storage path 145 which extends to a fully reflective mirror 150. Thereafter such a deflected pulse is directed to the left along the storage path to a second fully reflective mirror 155 and then downward to the first-mentioned or input polarization-sensitive element 115. The element 115 responds to such a pulse by deflecting it to the right along the main path. Somewhere in the closed-loop path a lens 160 is positioned so as to continually refocus the optical beam to pass through the modulator.

Assume that the polarization conditions of a pulse that has traversed the aforementioned storage path and been deflected to the right by the polarization-sensitive element 115 is not changed in propagating through the modulator 120. In that case the polarization of the pulse remains in the condition represented by the symbols 130. Consequently, the output polarization-sensitive element 135 is again effective to deflect the pulse to traverse the storage path. Successive traversals of the storage path will continue until the polarization of the circulating pulse is returned to its original state (arrows 110). When that occurs the output polarization-sensitive element 135 directs the pulse to the right to the utilization device 140 instead of upward to the mirror 150.

It is apparent, therefore, that by controlling the polarization condition of pulses propagated in the FIG. 1 arrangement, it is possible to cause such pulses to traverse the indicated storage path a specified number of times before being routed to the utilization device 140. In that way it is possible to determine in which of several discrete time slots each pulse will be delivered to the device 140. The time slot in which a pulse appears at the device 140 is determined by and is uniquely representative of a particular information signal pattern. Such an arrangement therefore furnishes the basis for a PIM optical communication system.

Figure 2:
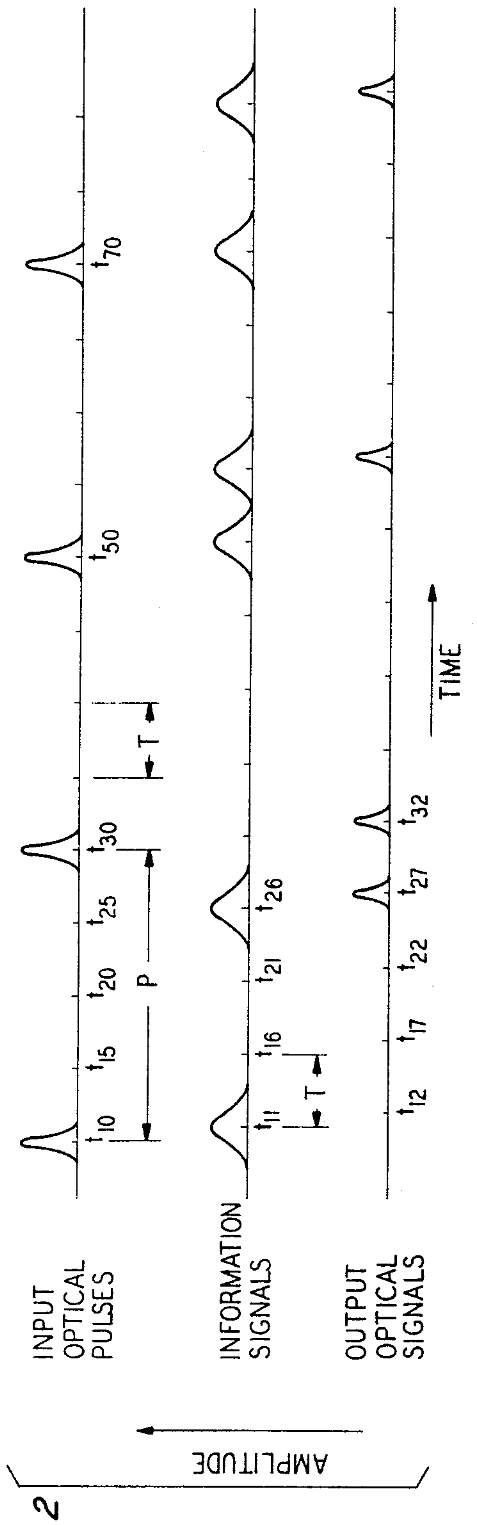
FIGS. 2 and 3 show various waveforms that are helpful in describing the mode of operation of the FIG. 1 arrangement.
Figure 3:
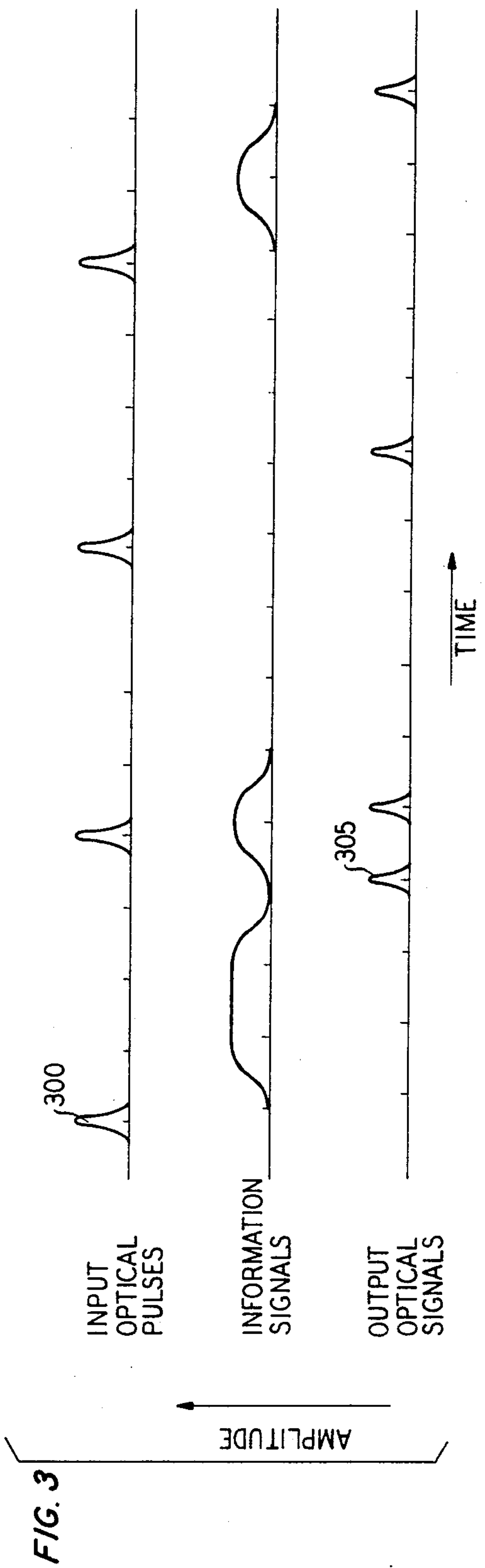

The mode of operation of the FIG. 1 arrangement can be better understood by considering the waveforms shown in FIGS. 2 and 3. Consider FIG. 2 first. As indicated previously above, the top row of FIG. 2 depicts a sequence of pulses emitted by the source 100. By way of illustration these pulses are shown as having a regularly recurring nature, with a period P. The interval between adjacent pulses is assumed to include a plurality of time slots or positions in which pulses may be controlled to occur. Thus, for example, the two left-hand pulses which are shown as being supplied by the source 100 in positions respectively centered about the times designated $t_{10}$ and $t_{30}$, have an interval between them that includes three time slots. These slots are respectively centered about the times marked $t_{15}$, $t_{20}$ and $t_{25}$. In accordance with the principles of the present invention the input pulse centered at $t_{10}$ is selectively controlled by the FIG. 1 arrangement such that the pulse is delivered to the utilization device 140 in a specified one of four time slots. These slots are respectively centered about the times $t_{12}$, $t_{17}$, $t_{22}$ and $t_{27}$ which are seen from FIG. 2 to occur slightly after the times $t_{10}$, $t_{15}$, $t_{20}$ and $t_{25}$ respectively. The delay between $t_{10}$ and $t_{12}$, as well as that between $t_{15}$ and $t_{17}$, between $t_{20}$ and $t_{22}$ and between $t_{25}$ and $t_{27}$, is attributable to the time required for a pulse to propagate from the source 100 to the utilization device 140. In other words, for example, if the input pulse emitted by the source 100 in the time slot centered about $t_{10}$ is propagated directly along the main path 105 to the device 140, without traversing the storage path 145, the pulse will be applied to the device 140 in the time slot centered about $t_{12}$. Similarly, if the input pulse at $t_{10}$ is controlled to traverse the storage path 145, the pulse will be delivered to the device 140 at $t_{17}$, $t_{22}$ or $t_{27}$ depending respectively on whether the pulse is directed to traverse the storage path one, two or three times.

One illustrative manner of controlling the number of times that an input pulse traverses the storage path 145 of FIG. 1 is represented in FIG. 2. Assume that at time $t_{11}$ the input optical pulse has reached the modulator 120 and that during its propagation therethrough an information signal (see second row of FIG. 2) is applied to the modulator by the source 125. (The relative timing between the sources 100 and 125 is controlled by a synchronizing signal source 175.) As a result of such activation of the modulator, the polarization vector of the propagating pulse is rotated by 90°, to the orientation represented by the symbols 130, in a manner well known in the art. Hence, the polarization-altered pulse is deflected by the polarization-sensitive element 135 to traverse the storage path 145. Subsequently, the stored pulse reaches the modulator 120, at time $t_{16}$. (The time interval between $t_{11}$ and $t_{16}$ is the storage time of the traversed loop and is designated T. This interval is equal to the time required for a pulse to travel along the storage path between the elements 135 and 115 plus the time taken by the pulse to propagate along the main path from the element 115 to the element 135.) If at time $t_{16}$ the modulator is deactivated (no information signal applied thereto) and remains so during the propagation of the pulse therethrough, as indicated in FIG. 2, the pulse retains its polarization-altered condition. Such a pulse is subsequently deflected by the element 135 to again traverse the storage path. Accordingly no pulse is delivered to the utilization device 140 in the time slot centered about $t_{17}$.

Similarly, it is evident that no pulse is delivered to the utilization device 140 of FIG. 1 at time $t_{22}$. After traversing the storage path a third time, however, the pulse encounters a reactivated modulator, as indicated in FIG. 2 by the presence of an information signal centered about $t_{26}$. As a consequence the polarization vector of the stored pulse is rotated back to its initial or reference condition. In response thereto the polarization-sensitive element 135 directs the pulse to the device 140. The pulse applied to the device 140 is shown in the bottom row of FIG. 2 centered about $t_{27}$.

Thus, in response to two spaced-apart information signals applied to the modulator 120 of FIG. 1, the first input optical pulse supplied by the source 100 has been shown to have been controllably delayed by the FIG. 1 arrangement. In particular, for the specific spacing shown between the first and second information signals in FIG. 2, the first input pulse was delayed to appear at the device 140 in the fourth or last time slot of the four slots in which the first pulse can possibly occur. In this way a predetermined spacing between a pair of input information signals has been converted into the positioning of an optical pulse in a particular one of a plurality of discrete time slots.

As indicated in FIG. 2, the next input optical pulse (that is, the one centered about $t_{30}$) is assumed to encounter a deactivated modulator 120. As a result thereof this pulse is not controlled to traverse the storage path but instead is routed directly to the utilization device 140. This pulse is depicted in the bottom row of FIG. 2 as being applied to the device 140 in the slot centered about $t_{32}$. This slot is the first one of the four indicated slots in which the second input pulse may be controlled to occur.

The next two input optical pulses (that is, those occurring in positions centered about $t_{50}$ and $t_{70}$) are depicted in FIG. 2 as having been delayed to the second and third time slots respectively of the plural slots associated therewith. The information signals required to achieve this delaying action for each input pulse are shown in FIG. 2.

Other information signal formats are feasible for selectively controlling the delay imparted to an input pulse by the FIG. 1 arrangement. Thus, instead of utilizing spaced-apart pairs of information signals, as shown in FIG. 2, a signal-duration format is effective to selectively control the input pulses to achieve a PIM format. Several illustrative information signals having respectively different widths and durations are depicted in FIG. 3.

The FIG. 1 arrangement must be modified slightly to permit it to respond in the desired fashion to the information signals shown in FIG. 3. One exemplary modification involves optically biasing the modulator 120 using well-known techniques (such as, for example, by using a Babinet compensator 122) so that quiescently, in the absence of information signals applied thereto, the polarization vector of an input pulse is rotated by 90° in the course of propagating through the modulator. (The compensator 122 is shown in dashed outline in FIG. 1 and also in FIG. 4, to indicate that it is to be employed only if the signal-duration format of FIG. 3 is utilized to achieve a PIM system.) The application of an information signal to a modulator biased in this manner is adapted to be effective to cancel the polarization-rotating effect of the bias. Hence, the application of an information signal to the modulator 120 causes an optical pulse to undergo no net polarization change in transit therethrough. Conversely, the absence of an applied information signal allows the modulator to rotate the polarization vector of an optical pulse. It is apparent that this mode of operation is the opposite of that described above in connection with FIG. 2.

At the time that the first input pulse 300 shown in FIG. 3 reaches the modulator 120 of FIG. 1, the associated information signal is not present to counter the polarization-shifting effect of the bias applied to the modulator. Accordingly, the polarization vector of the pulse is rotated by 90°, to the condition represented by the symbols 130 in FIG. 1. As a result, the pulse is routed by the element 135 to the storage path 145. During the next two passes through the modulator 120, the polarization condition of the circulating pulse remains unchanged due to the application to the modulator 120 of an information signal (see second row of FIG. 3). Accordingly, the pulse continues to be routed along the storage path. Subsequently, during the fourth transit of the pulse through the modulator, the information signal has decreased to zero so that the applied optical bias is again effective to rotate the polarization vector of the pulse. In that way the polarization condition of the pulse is restored to its initial or reference state (represented by the arrows 110 in FIG. 1). In response thereto the polarization-sensitive element 135 routes the pulse to the utilization device 140. This pulse, designated 305 in FIG. 3, appears in the fourth time slot of the output slots associated with the pulse 300.

In a similar way it is evident from FIG. 3 that other subsequent information signals having different durations (including a no-duration information signal) are effective to cause their respectively associated input pulses to be delivered to the device 140 in different output time slots.

Figure 4:
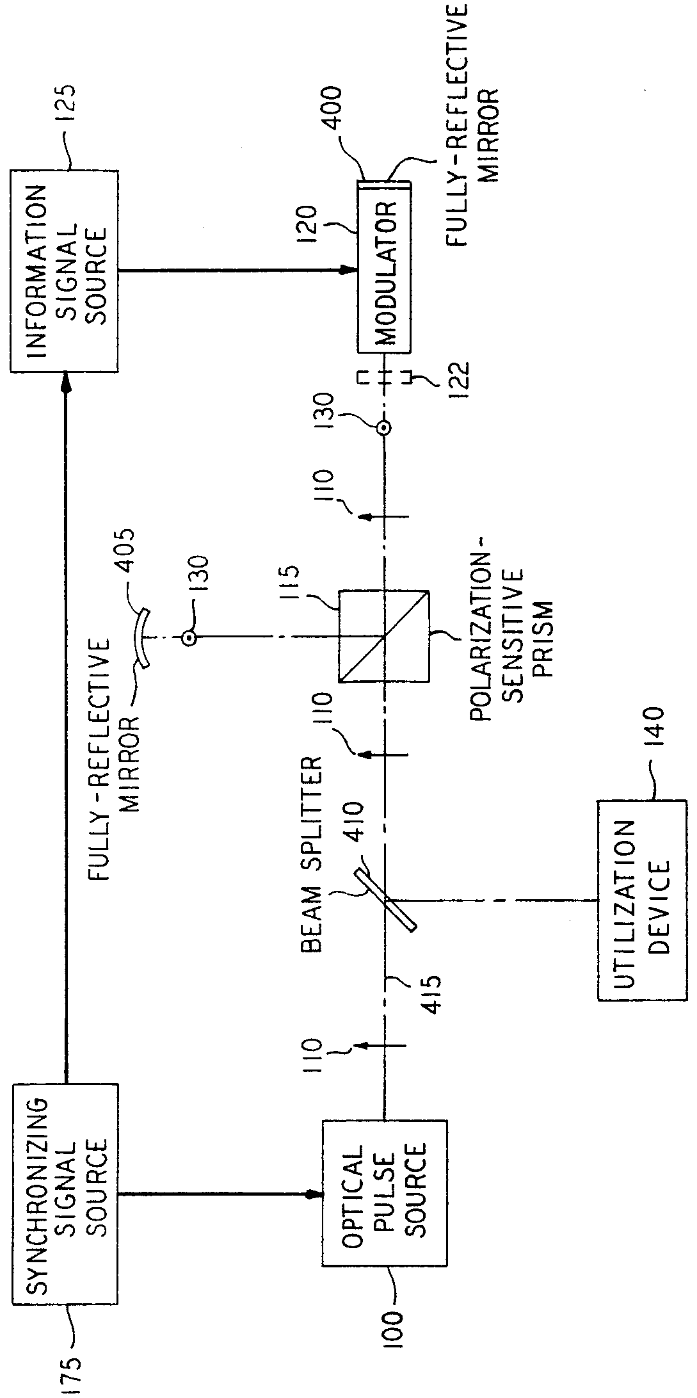
FIG. 4 shows another illustrative embodiment of the principles of this invention.

As advantageous alternative embodiment of the principles of the present invention is shown in FIG. 4. The arrangement shown there includes a number of elements that may be identical in structure and function to the correspondingly numbered elements depicted in FIG. 1. The elements that are common to FIGS. 1 and 4 include the optical pulse source 100, the polarization-sensitive element 115, the modulator 120, the information signal source 125, the utilization device 140 and the synchronizing signal source 175.

Disposed on the right-hand end of the modulator 120 in FIG. 4 is a fully reflective dielectric coating 400 which serves as a mirror element. The FIG. 4 arrangement also includes another fully reflective mirror element 405 and a conventional beam splitter 410. Advantageously, the mirror 405 is a spherical mirror used to continually refocus the optical beam so as to properly enter the modulator element 120.

An optical input pulse supplied by the source 100 of FIG. 4 is propagated along a main path 415. This pulse is assumed to be polarized in the same initial or reference vertically polarized condition (arrows 110) specified above in connection with the description of FIG. 1. A portion of this pulse passes through the beam splitter 410 while the remainder thereof is reflected upward and lost. The pulse that passes through the beam splitter 410 propagates through the polarization-sensitive element 115, through the modulator 120 from left to right and, after reflection from the mirror element 400, through the modulator 120 from right to left. If the modulator 120 is activated during this time (and assuming the mode of operation represented in FIG. 2) the polarization vector of a pulse propagated therethrough is thereby rotated by 90° to the horizontally polarized condition indicated by the encircled dots 130. A pulse whose polarization vector is so rotated is deflected upward by the polarization-sensitive element 115 to the fully reflective mirror 405. Thereafter, so long as the polarization condition of the pulse remains as indicated by the symbols 130, the pulse continues to circulate in the path which includes the element 115 and the modulator 120 and which is bounded by the mirrors 400 and 405. Finally, when the modulator 120 is reactivated, thereby to return the polarization condition of the circulating pulse to the initial vertically polarized state, the pulse emanating from the modulator is directed to the left by the polarization- sensitive element 115 toward the beam splitter 410. In turn a portion of this pulse is reflected downward by the beam splitter 410 to the utilization device 140. (The remainder of the pulse incident on the beam splitter passes therethrough and propagates to the source 100. This portion represents lost energy.)

Thus it is seen that the FIG. 4 arrangement includes a storage path which an input pulse may be made to traverse a specified number of times. Each such traversal corresponds to delaying a pulse from one to the next successive one of a plurality of output time slots. The advantage of this alternative arrangement is that lower-amplitude information signals may be employed therein, due to the fact that light passes through the modulator twice.

It was assumed above that the information signals applied to the modulator 120 of FIG. 4 are of the type shown in FIG. 2. It is apparent, however, that the information signal format represented in FIG. 3 is also suitable for controlling the operation of the FIG. 4 system. In that case the FIG. 4 system includes, for example, a compensator 122.

It is to be understood that the above-described arrangements are only illustrative of the application of the principles of the present invention. In accordance with those principles numerous other arrangements may be devised by those skilled in the art without departing from the spirit and scope of the invention. Thus, for example, it would be straightforward to plane polarize the optical input pulses at 45° and to substitute a polarization-sensitive prism and a Faraday-rotation isolator for the beam splitter 410 in FIG. 4 to achieve the pulse routing function ascribed to the element 410 An advantage of this substitute arrangement is its lower optical loss. In addition, it is apparent that the output pulses provided by the arrangements described herein may be multiplexed in a straightforward way with other such output pulses to achieve a high-capacity optical communication system.

What is claimed is:

1. In combination in an optical signal processing system,
   means for generating spaced-apart optical pulses and for propagating said pulses along a main path, each of said pulses being characterized by a reference polarization condition,
   a source of information signals,
   modulator means interposed in said main path and responsive to said signals for altering the polarization condition of said pulses,
   and polarization-sensitive means interposed in said main path to intercept said pulses both before and after they traverse said modulator means and responsive to the polarization of a pulse being in the altered condition for directing such a pulse to repeatedly traverse a storage path which includes a portion in common with said main path and another portion distinct therefrom.

2. Apparatus for discretely delaying an optical pulse that is to be propagated along a main path from an input source to a utilization device, said input pulse being characterized by a reference polarization condition, said apparatus comprising:

a first polarization-sensitive element, a polarization-controlling modulator and a second polarization-sensitive element disposed in that order along said main path between said input source and said utilization device, an auxiliary path extending between said first and second elements and being noncollinear with respect to said main path, said auxiliary path including means disposed therein for directing pulses from said second element to said first element, said first element being responsive to a pulse directed thereat along said main path and having said reference polarization condition for routing said pulse along said main path, said first element being responsive to a pulse directed thereat along said auxiliary path and having an altered condition with respect to said reference polarization condition for also routing said pulse along said main path, said second element being responsive to a pulse directed thereat along said main path and having said reference polarization condition for routing said pulse along said main path to said utilization device, said second element being responsive to a pulse directed thereat along said main path and having said altered polarization condition for routing said pulse along said auxiliary path, and means coupled to said modulator for controlling the state thereof thereby to control the polarization condition of pulses propagated through said modulator.

3. Apparatus as in claim 2 wherein said controlling means supplies spaced-apart information signals to said modulator, the spacing between said signals being determinative of the number of times an input pulse is controlled to traverse said auxiliary path before being routed to said utilization device.

4. Apparatus as in claim 2 wherein said controlling means supplies variable-duration information signals to said modulator, the durations of said signals being determinative of the number of times an input pulse is controlled to traverse said auxiliary path before being routed to said utilization device.

5. Apparatus as in claim 2 wherein said means disposed in said auxiliary path includes, a plurality of fully reflective mirrors for routing pulses from said second polarization-sensitive element to said first polarization-sensitive element, and means for refocussing said pulses to pass through said modulator.

6. Apparatus for discretely delaying an optical pulse that is to be propagated from an input source to a utilization device, said input pulse being characterized by a reference polarization condition, said apparatus comprising:

a modulator, a polarization-sensitive element responsive to a pulse from said source for routing said pulse to said modulator, means responsive to a pulse from said source for directing at least a portion of said pulse to said polarization-sensitive element and responsive to a pulse from said polarization-sensitive element for directing at least a portion of said pulse at laid utilization device, a fully reflective mirror responsive to a pulse propagated through said modulator for directing said pulse back through said modulator to said polarization-sensitive element, said polarization-sensitive element being responsive to the polarization condition of a pulse having been selectively altered with respect to said reference condition by said modulator for directing such a pulse along an auxiliary path that is distinct from the path that extends between said source and said modulator, said polarization-sensitive element being responsive to the polarization condition of said pulse not having been altered by said modulator for directing such a pulse to said directing means for routing to said utilization device, and a fully reflective element terminating said auxiliary path for causing any pulses directed along said auxiliary path by said polarization-sensitive element to be reflected back to said element, said polarization-sensitive element being responsive to a pulse reflected back thereto by said fully reflective element for directing such a pulse at said modulator.

7. Apparatus as in claim 6 wherein said directing means comprises a beam splitter, and wherein said fully reflective element is adapted to continually refocus pulses to pass through said modulator.

* * * * *